(12) United States Patent
Di Girolamo et al.

(10) Patent No.: US 6,310,294 B1
(45) Date of Patent: Oct. 30, 2001

(54) VERTICAL SEPARATION RACK FOR CABLE MANAGEMENT

(75) Inventors: Oscar Di Girolamo, Englewood Cliffs; John Hendricks, Bradley Beach, both of NJ (US); Mitch Rolnick, Atlanta, GA (US); Michael Trzaska, South River, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/541,591

(22) Filed: Apr. 3, 2000

(51) Int. Cl.[7] .................................................. H02G 3/00
(52) U.S. Cl. ........................ 174/101; 174/37; 174/95; 52/126.6; 211/26; 220/3.94
(58) Field of Search .................................. 174/48, 49, 50, 174/101, 68.1, 68.3, 95–97, 100, 37, 38, 39; 220/3.92, 3.94, 4.02; 211/10, 11, 275

(56) References Cited

U.S. PATENT DOCUMENTS

| | | | | |
|---|---|---|---|---|
| 314,568 | * | 3/1885 | Du Bois | 174/101 |
| 338,485 | * | 3/1886 | Clay | 174/37 |
| 2,471,970 | * | 5/1949 | Miloche | 174/37 |
| 4,166,195 | * | 8/1979 | Schwab | 174/95 |
| 4,627,679 | * | 12/1986 | Billete de V. et al. | 339/21 R |
| 4,990,722 | * | 2/1991 | Benito Navazo | 174/97 |
| 5,089,667 | * | 2/1992 | Goussin et al. | 174/101 |
| 5,147,122 | * | 9/1992 | Short | 312/321.5 |
| 5,154,299 | * | 10/1992 | Hwang | 211/11 |
| 5,367,127 | * | 11/1994 | Dormon | 174/146 |
| 5,548,932 | * | 8/1996 | Mead | 52/126.6 |
| 5,894,105 | * | 4/1999 | Scyocurka | 174/37 |
| 5,988,570 | * | 11/1999 | Gretz | 248/74.2 |

* cited by examiner

Primary Examiner—Dean A. Reichard
Assistant Examiner—Adolfo Nino

(57) ABSTRACT

A vertical separation rack for organizing various types of cabling includes a base member and a number of vertical walls, used to define partitions for each type of cabling. The base member preferably includes an arcuate profile to assist in the flow of the cable from the floor and across the rack. The base member may include a number of apertures in the top surface and each wall a number of attachment pins so that the position (and number) of walls may be adjusted for different installation arrangements. The vertical separation rack of the present invention is particularly well-suited for use in raised floor environments, where racks may be disposed every two to three feet to maintain cable organization across the entire subfloor expanse.

3 Claims, 3 Drawing Sheets

VERTICAL SEPARATION RACK FOR CABLE MANAGEMENT

TECHNICAL FIELD

The present invention relates to a vertical separation rack and, more particularly, to a vertical separation rack including separate partitions for organizing various types of cabling.

BACKGROUND OF THE INVENTION

The proliferation of various types of inter-networked communications/computer equipment has resulted in large numbers of various types of cabling being required to interconnect the different hardware elements. In some environments, therefore, hundreds of different cables may be located and used to connect equipment. In particular, building locations that use raised flooring often include a mass of such cabling underneath the raised floor. Problems often arise when it is necessary to repair, replace or modify these cable installations, since the cabling merely lays underneath the raised floor in a disorganized, haphazard fashion. Much time is therefore spent in determining the various connections and interconnections of the cabling.

A need remains, therefore, for a cable organizing arrangement that can be used in a raised floor environment that is effective in separating various types of cables into predefined categories.

SUMMARY OF THE INVENTION

The need remaining in the prior art is addressed by the present invention, which relates to a vertical separation rack and, more particularly, to a vertical separation rack including separate partitions for organizing various types of cabling.

In accordance with the present invention, a rack including an arcuate base with a plurality of apertures formed therein is used. A plurality of removable vertical walls are disposed across the expanse of the arcuate base so that various types of cabling may be laid across the base and maintained in separate regions by using the vertical walls as dividers. The removable walls are formed to include pins across the bottom surface, where the pins mate with the apertures to define the location of each wall.

In a preferred embodiment of the present invention, the height of the walls is chosen so that the rack will remain below the location of a raised floor, while also providing sufficient height to prevent the cabling from becoming intermixed.

It is an aspect of the present invention that the number of walls used within a particular rack structure of the present invention is determined based upon the number of different types of cabling that may be run, and may be adjusted by adding/removing walls, as need be.

It is a further aspect of the invention to require an arcuate profile for the base so as to provide a smooth transition from the ground and over the rack base, thereby preventing buckling or kinking of the cables as they traverse the rack.

Other and further aspects of the present invention will become apparent during the course of the following discussion and by reference to the accompanying drawings.

BRIEF DESCRIPTION OF THE DRAWINGS

Referring now to the drawings.

DETAILED DESCRIPTION

Figure 1:
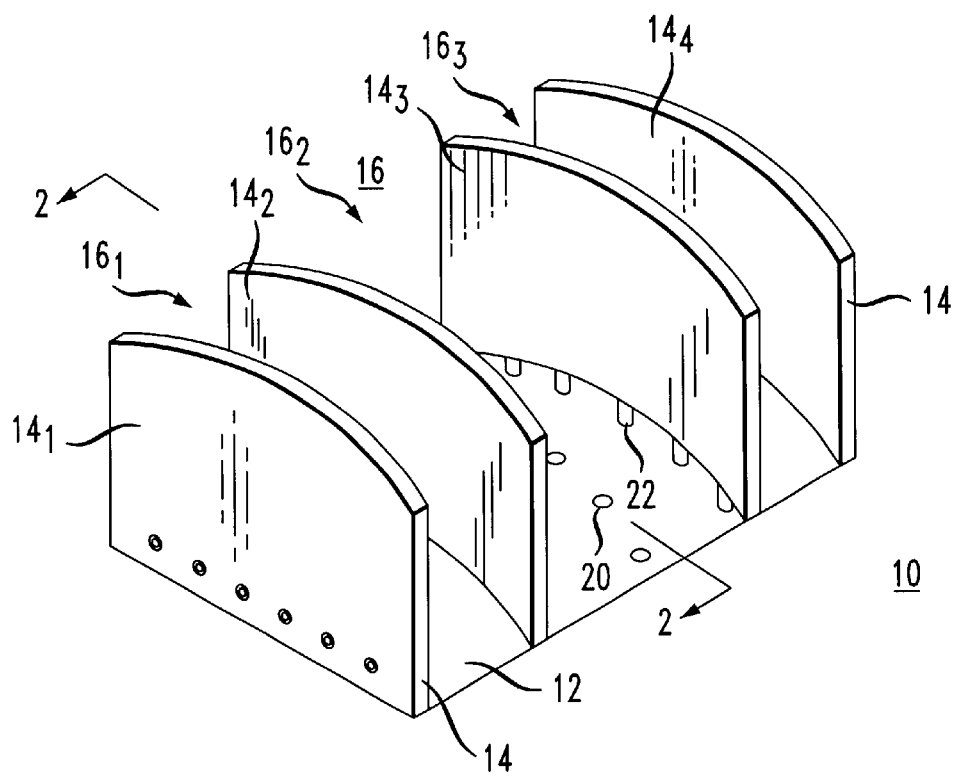
FIG. 1 illustrates an isometric view of a vertical separation rack formed in accordance with the present invention.
Figure 2:
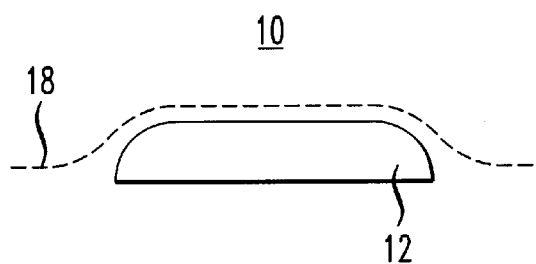
FIG. 2 is a cut-away side view of the rack of FIG. 1, taken along line 2—2.

An isometric view of an exemplary vertical separation rack 10 of the present invention is illustrated in FIG. 1. As shown, rack 10 includes an arcuate base member 12 and a plurality of wall partitions 14. FIG. 2 is a cut-away side view of rack 10 that more clearly illustrates the arcuate profile of base member 12. An exemplary cable 18 is illustrated in phantom in FIG. 2. In accordance with the present invention, rack 10 may comprise any desired number of wall partitions 14. When used to organize various types of cable, therefore, each cable type may be fed through a different opening 16 formed by a pair of contiguous wall partitions 14. In the specific arrangement as illustrated in FIG. 1, a first, relatively narrow opening $16_1$ is formed by adjacent wall partitions $14_1$ and $14_2$. A second, relatively wide opening $16_2$ is defined by wall partitions $14_2$ and $14_3$, and lastly, a third, relatively narrow cable opening $16_3$ is defined by wall partitions $14_3$ and $14_4$. Therefore, in accordance with this particular embodiment of the present invention, three different types of cabling can be separated and maintained in an organized fashion—particularly when rack 10 is used beneath a raised floor in a building using an extensive amount of cabling. In general, a rack such as that illustrated in FIG. 1 would be disposed every two or three feet along the subfloor surface of the office space, so as to maintain the organization of the cabling.

The arcuate profile of base member 12 is useful in preventing the cabling from becoming bent or kinked when transitioning from the subfloor to the rack. FIG. 2 is a side view of base member 12 and illustrates, in phantom, an exemplary cable 18 as deployed over base member 12.

Figure 3:
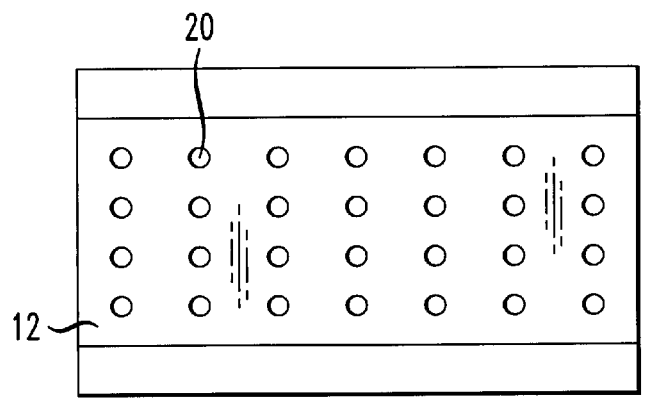
FIG. 3 is a bottom view of an exemplary vertical separation rack, including a plurality of apertures for inserting various walls at different locations.
Figure 4:
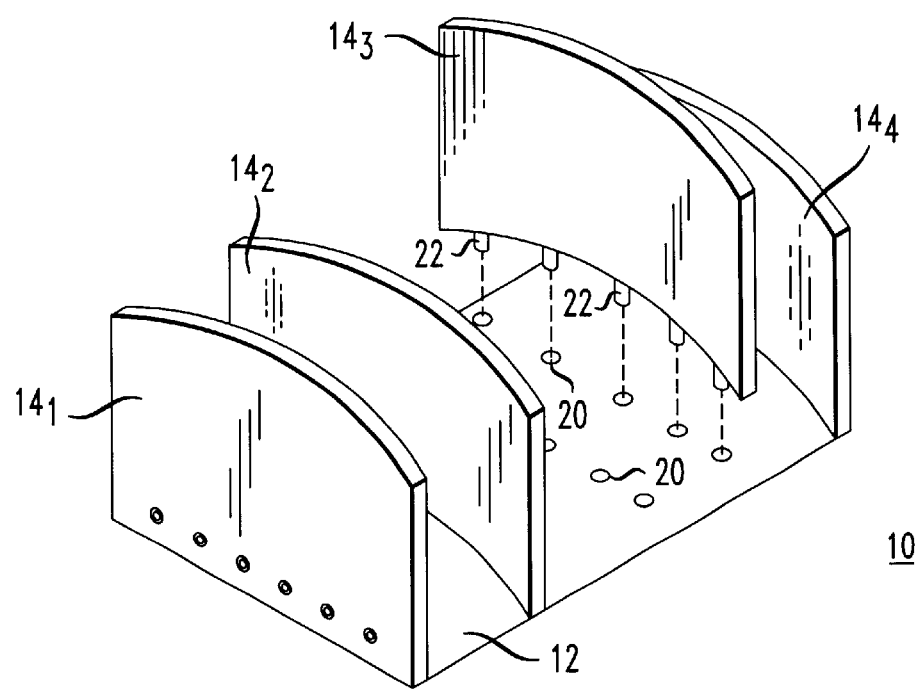
FIG. 4 is an exploded view of the rack of FIG. 1, illustrating in particular the capability of removing and relocating a wall within the rack.

In a preferred embodiment of the present invention, each wall partition 14 is removable and can be relocated, as necessary, to different positions across the width of base member 12. For example, base member 12 can be formed to include a plurality of positioning apertures 20, where a few such apertures 20 are visible in the view of FIG. 1. FIG. 3 contains a bottom view of rack 10 and clearly illustrates a plurality of such apertures 20 disposed across the width of base 12. Each wall partition 14 would then include a plurality of pins 22 that would mate with apertures 20 and provide secure attachment of wall partition 14 to base member 12. FIG. 4 is an exploded isometric view of rack 10, illustrating in particular pins 22 as formed on an exemplary wall partition $14_3$, as well as a number of apertures 20 formed on base member 12.

The ability to move/remove/add wall partitions provides flexibility in allowing vertical separation rack 10 to be adjusted for use as the number and types of cabling changes. This is particularly advantageous since it is presumed that each installation location will have a different cabling layout and the ability to adjust the location and number of partitions within the vertical separation rack allows for a generic rack to be manufactured, yet tailored to meet the needs of each installation.

Figure 5:
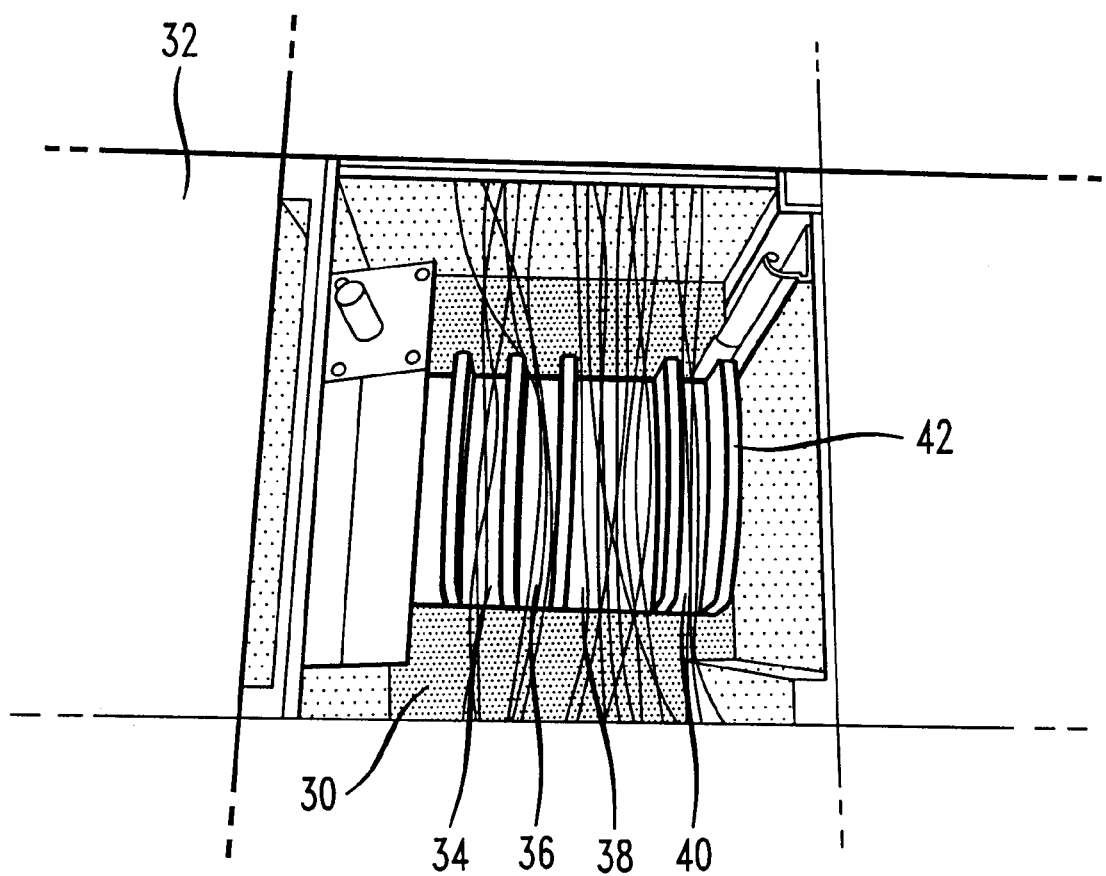
FIG. 5 is an isometric view of an exemplary vertical separation rack of the present invention, including various cables as laid across the rack.

FIG. 5 is a top view of an exemplary vertical rack 30 as located underneath a raised floor 32. In this arrangement, four different types of cabling 34, 36, 38 and 40 are illustrated as separated within the partitions 42 of rack 30. In this particular embodiment, cabling 38 requires a larger space than the other types of cable, so the positioning of wall partitions 42 has been adjusted to provide the largest space for this group of cables.

It is to be understood that the arrangement of the present invention as described above is exemplary only. For example, any desired number of wall partitions may be used with the inventive rack. Additionally, although best-suited for use with a raised floor environment, the vertical separation rack of the present invention is not so limited and can, indeed, be used in any situation where it is needed to maintain different types of cabling in an organized fashion. Further, the spacing between racks as mentioned above is also considered to be exemplary only. In general, the subject matter of the present invention is considered to be limited only by the claims appended hereto.

What is claimed is:

1. A vertical separation rack for separating a plurality of different cable types into different partitions, said rack comprising:

a base member including a top surface and a bottom surface separated therefrom, said top surface defined as including a front edge and a rear edge and comprising a plurality of apertures disposed in sets from said front edge to said rear edge; and a plurality of vertical walls disposed in and attached to said base member so as to extend in an upward direction therefrom, a separate cable partition defined by each pair of adjacent vertical walls, with at least one vertical wall being removable and including a plurality of attachment pins across the bottom surface thereof such that said removable wall can be inserted into any desired set of apertures on said base member top surface to adjust the dimensions of a partition.

2. A vertical separation rack as defined in claim 1 wherein said base member comprises an arcuate base member that is curved to provide a smooth transition for cabling disposed across said base member.

3. A vertical separation rack as defined in claim 1 wherein each vertical wall of the plurality of vertical walls is removable and includes a plurality of attachment pins so that each partition opening can be adjusted to accommodate for different amounts of cabling associated therewith.

\* \* \* \* \*